United States Patent
Agarwal et al.

(10) Patent No.: US 12,356,257 B2
(45) Date of Patent: Jul. 8, 2025

(54) METHOD AND USER EQUIPMENT FOR ENHANCING VOICE CALL PERFORMANCE

(71) Applicant: SAMSUNG ELECTRONICS CO., LTD., Suwon-si (KR)

(72) Inventors: Rishav Agarwal, Bangalore (IN); Danish Ehsan Hashmi, Bangalore (IN); Shanthossh Nagarajan, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 348 days.

(21) Appl. No.: 17/854,627

(22) Filed: Jun. 30, 2022

(65) Prior Publication Data

US 2023/0022707 A1 Jan. 26, 2023

Related U.S. Application Data

(63) Continuation of application No. PCT/KR2022/008571, filed on Jun. 16, 2022.

(30) Foreign Application Priority Data

Jul. 22, 2021 (IN) .............................. 202141033060
May 23, 2022 (IN) ............................ 2021 41033060

(51) Int. Cl.
*H04W 36/00* (2009.01)
*H04B 17/318* (2015.01)
(Continued)

(52) U.S. Cl.
CPC ...... *H04W 36/0058* (2018.08); *H04B 17/318* (2015.01); *H04L 65/1016* (2013.01); *H04L 65/1073* (2013.01); *H04W 36/00226* (2023.05)

(58) Field of Classification Search
CPC ............ H04L 65/1016; H04L 65/1073; H04B 17/318; H04W 36/0022; H04W 36/0058
See application file for complete search history.

(56) References Cited

U.S. PATENT DOCUMENTS 9,906,992 B1* 2/2018 Youtz ................ H04W 36/0033
10,560,204 B1* 2/2020 Patel ..................... H04W 48/12
(Continued)

FOREIGN PATENT DOCUMENTS

| CN | 108702593 | 10/2018 |
| CN | 111031587 | 4/2020 |

(Continued)

OTHER PUBLICATIONS

Search Report and Written Opinion dated Sep. 23, 2022 issued in International Patent Application No. PCT/KR2022/008571.
(Continued)

*Primary Examiner* — Rasheed Gidado
(74) *Attorney, Agent, or Firm* — NIXON & VANDERHYE P.C.

(57) ABSTRACT

Embodiments herein provide a method for performing voice call performance by a user equipment (UE). A voice call is preferred for a cellular network over a Wi-Fi network, an IMS is registered over a 5G BS, the 5G BS is not supported for the voice call, and a Wi-Fi device and a 4G BS are supported for the voice call. The method includes: detecting an event related to the voice call; comparing signal strength of the Wi-Fi device and signal strength of the 4G BS; shifting an IMS registration from the 5G BS to the Wi-Fi device, upon determining that the signal strength of the Wi-Fi device is greater than the signal strength of the 4G BS; and initiating the voice call over the Wi-Fi device upon detecting a trigger for the voice call.

20 Claims, 10 Drawing Sheets

(51) Int. Cl.
  *H04L 65/1016*  (2022.01)
  *H04L 65/1073*  (2022.01)

(56)          References Cited

U.S. PATENT DOCUMENTS

| 2015/0350983 | A1* | 12/2015 | Kwok .................. H04W 36/247 |
| | | | 370/331 |
| 2018/0006957 | A1 | 1/2018 | Ouyang et al. |
| 2018/0063754 | A1 | 3/2018 | Wang et al. |
| 2019/0090165 | A1 | 3/2019 | Huang-Fu et al. |
| 2019/0110236 | A1* | 4/2019 | Huang ............ H04W 36/00226 |
| 2019/0274082 | A1* | 9/2019 | Vemuri ......... H04W 36/008375 |
| 2019/0281506 | A1* | 9/2019 | Chiang ............... H04L 65/1104 |
| 2020/0059839 | A1 | 2/2020 | Zhou et al. |
| 2020/0267618 | A1 | 8/2020 | Kye et al. |
| 2021/0051530 | A1* | 2/2021 | Venkataraman ...... H04W 88/06 |
| 2021/0105691 | A1 | 4/2021 | Zhu et al. |
| 2021/0136645 | A1* | 5/2021 | Zhao ...................... H04W 36/30 |
| 2021/0153290 | A1* | 5/2021 | Ahmad .................. H04W 76/16 |
| 2021/0250830 | A1* | 8/2021 | Huang .................. H04W 48/18 |
| 2023/0292231 | A1* | 9/2023 | Yang ............... H04W 36/00222 |
| 2024/0056944 | A1* | 2/2024 | Lo ....................... H04W 36/305 |

FOREIGN PATENT DOCUMENTS

| CN | 113055856 | 6/2021 |
| WO | 2020/159684 | 8/2020 |
| WO | 2020/164682 | 8/2020 |

OTHER PUBLICATIONS

Indian Office Action issued Feb. 17, 2023 in corresponding Indian Patent Application No. 202141033060.

* cited by examiner

METHOD AND USER EQUIPMENT FOR ENHANCING VOICE CALL PERFORMANCE

CROSS-REFERENCE TO RELATED APPLICATIONS

This application is a continuation of International Application No. PCT/KR2022/008571, filed on Jun. 16, 2022, in the Korean Intellectual Property Receiving Office and claiming priority to Indian Provisional patent application number 202141033060, filed on Jul. 22, 2021, in the Indian Patent Office, and to Indian Complete patent application number 202141033060, filed on May 23, 2022, in the Indian Patent Office, the disclosures of each of which are incorporated by reference herein in their entireties.

BACKGROUND

Field

The disclosure relates to wireless communication, and for example, to a method and a User Equipment (UE) for enhancing voice call performance.

Description of Related Art

A cellular network is preferred over a Wireless Fidelity (Wi-Fi) network for voice services by most of cellular network operators. As a result, even if a strong Wi-Fi signal is present at a User Equipment (UE), the UE uses the voice services under the cellular network, provided that a cellular signal should be above a signal threshold (e.g. −105 decibel). The UE uses the Wi-Fi network for the voice services as a secondary option only when the cellular signal is below the signal threshold.

FIG. 1A is a diagram illustrating a conventional method of handling a voice call by a UE (10). Consider a scenario, a New Radio (NR) cellular signal is below the signal threshold and the Wi-Fi signal is strong at the UE (10). Also, a NR cell does not support Voice Over NR (VONR), a Long-Term Evolution (LTE) cell supports Voice Over LTE (VOLTE), and a Wi-Fi device supports Voice Over Wi-Fi (VOWiFi). At 11, a voice call initiated at the UE (10) is ongoing through the Wi-Fi device. Even if the voice call is continuing through the Wi-Fi device, the UE (10) is capable to detect a strong NR cellular signal when the UE (10) is registered on a NR Stand Alone (SA). At 12, upon detecting the strong NR cellular signal, the UE (10) tries to handover the voice call to the NR cell from the Wi-Fi device. At 13, since, the VONR is not supported by the NR cell, the UE (10) does an Evolved Packet System Fallback (EPSFB) to the LTE cell from the NR cell to continue the voice call. At 14, if the signal strength of the LTE cell is less than the signal threshold, then the UE (10) ends up by handing over the voice call from the LTE cell to the Wi-Fi device if the Wi-Fi signal is better than LTE signal. Again, a handover will be triggered from the Wi-Fi device to the NR cell and the aforementioned loop of handover will be formed resulting in very poor call quality.

Similarly, when the voice call is triggered and the UE (10) has registered an Internet protocol Multimedia Subsystem (IMS) on the NR cell, then the UE (10) triggers the EPSFB instead of VOWiFi based on the priority. If LTE signal conditions are too weak, or if EPSFB is delayed due to MME congestions, the voice call will either be delayed/dropped or poor quality. If the signal strength of the LTE cell is less than the signal threshold, then the UE (10) hands over the voice call from the LTE cell to the Wi-Fi device if the Wi-Fi signal is better than the LTE signal. Again, the handover will be triggered from the Wi-Fi device to the NR cell and the aforementioned loop of handover will be formed resulting in very poor call quality.

FIG. 1B is a diagram illustrating signal coverage area of the NR cell, the LTE cell, and the Wi-Fi device. Consider a scenario, the NR cellular signal (22) is weak, whereas the Wi-Fi signal (23) and the LTE signal (21) are strong at the UE (10). Also, the NR cell does not support the VONR, whereas the LTE cell supports the VOLTE, and the Wi-Fi device supports the VOWiFi. The UE (100) never knows about the strong LTE signal (21) while camps on the NR cell, and the voice call continues on the Wi-Fi device even though the voice call is highly possible on the LTE cell. The cellular network operators prefer the VOLTE over the VOWIFI in a cellular preferred mode due to various reasons. The cellular preferred mode is a mode at which an IMS registration should be available over the cellular network and not the Wi-Fi network even if the UE (10) is connected to the Wi-Fi network and the VOWiFi is supported. Also, instead of handing over the call from the Wi-Fi device to the NR cell, and further transfer from the NR cell to the LTE cell, it is preferred to handover the voice call from the Wi-Fi device to the LTE cell in case the NR cell is weak or not supports the VONR, to maintain the cellular preference of the UE and reduce signalling wastages.

Since, the UE (100) is not aware of the voice call support of the NR cell, measuring the LTE cell doesn't make sense while the voice call is continuing in the Wi-Fi device unless the UE (10) is sure that the NR cell doesn't support VONR. Probably, a few neighboring cells with frequencies f1 and f2 may be found around the LTE cell that operates with frequency f3, where signal strength of f1>signal strength of f2>signal strength of f3. But, the UE (10) redirects the voice call to the LTE cell with the frequency f2 which is not sufficient to maintain the voice call. It is desired for the UE (10) to choose the LTE cell with the frequency f1 with highest RSSI that ensures to maintain the voice call without call drop.

Thus, it is desired to enhance voice call performance by avoiding the aforementioned problems in existing voice call mechanisms.

SUMMARY

Embodiments of the disclosure provide a method and a UE for enhancing voice call performance.

Embodiments of the disclosure avoid looping of transferring a voice call from a Wi-Fi device to a NR cell, then from the NR cell to an LTE cell, and then from the LTE cell to the Wi-Fi device, and so on, when the NR cell does not support VONR.

Embodiments of the disclosure transfer the voice call to the LTE cell with strong signal from the NR cell and avoid transferring the call to the Wi-Fi device from the NR cell when the NR signal strength is low to sustain the voice call.

Accordingly, example embodiments herein provide a method for performing voice call performance by a User Equipment (UE). The method includes: monitoring, by the UE, events performing at the UE, where signals of a 5th Generation (5G) Base Station (BS), a 4th Generation (4G) BS, and a Wireless Fidelity (Wi-Fi) device are received at the UE, a voice call is preferred for a cellular network over a Wi-Fi network at the UE, an IMS is registered over the 5G BS, the 5G BS is not supported for the voice call, and the Wi-Fi device and the 4G BS are supported for the voice call;

detecting, by the UE, an event related to the voice call; comparing, by the UE, signal strength of the Wi-Fi device and signal strength of the 4G BS; shifting, by the UE, an IMS registration from the 5G BS to the Wi-Fi device, based on determining that the signal strength of the Wi-Fi device is greater than the signal strength of the 4G BS; detecting, by the UE, a trigger for the voice call; and initiating, by the UE, the voice call over the Wi-Fi device.

In an example embodiment, the method includes disabling, by the UE, a cellular Key Performance Indicator (KPI) measurement till end of the voice call, upon initiating the voice call.

In an example embodiment, the method includes: detecting, by the UE, a precondition associated with a Radio Access Technology (RAT), the method includes: detecting, by the UE, a strength of the signals received from the 5G BS and/or one or more 4G BSs meeting a first threshold condition, the strength of the signal received from the 5G BS being less than a fourth threshold signal strength, a strength of the signal received from the Wi-Fi device being less than a rove-out threshold for handover, and the strength of the signal received from the Wi-Fi device being less than a fifth threshold signal strength; transferring, by the UE, the voice call from the Wi-Fi device to the 5G BS or a first 4G BS of the one or more 4G BSs.

In an example embodiment, detecting, by the UE, that the strength of signals received from the 5G BS and the one or more 4G BSs meets the first threshold condition, includes: detecting, by the UE, that the strength of the signal received from the 5G BS is greater than a first threshold signal strength, determining, by the UE, the strength of the signal received from the one or more 4G BSs by performing a Long Term Evolution (LTE) profiling with a period, the period being determined based on UE parameters, and detecting, by the UE, that the strength of signals received from the one or more 4G BSs is greater than a second threshold signal strength, wherein the second threshold signal strength is greater than or equal to the first threshold signal strength.

In an example embodiment, the method includes disabling, by the UE, a 5G Stand Alone (SA) measurement till end of the voice call, upon transferring the voice call to the first 4G BS.

In an example embodiment, transferring, by the UE, the voice call from the Wi-Fi device to the first 4G BS of the one or more 4G BSs, includes: transferring, by the UE, the voice call from the Wi-Fi device to the 5G BS, upon detecting that the strength of signals received from the 5G BS and the one or more 4G BSs meets the first threshold condition, sending, by the UE, a Measurement Report (MR) to an optimal 4G BS of the one or more 4G BSs to aid the cellular network in redirection, and transferring, by the UE, the voice call from the 5G BS to the first 4G BS or the optimal 4G BS based on a redirection from the cellular network.

In an example embodiment, where the method includes checking, by the UE, whether the strength of the signal received from the first 4G BS is less than a third threshold signal strength upon transferring the voice call from the 5G BS to the first 4G BS, the method includes: performing, by the UE, continuing the voice call on the first 4G BS, upon determining that the strength of the signal received from the first 4G BS is not less than the third threshold signal strength, or transferring the voice call from the first 4G BS to the Wi-Fi device or a second 4G BS, upon determining that the strength of the signal received from the first 4G BS is less than the third threshold signal strength, wherein the second 4G BS has the signal strength greater than the signal strength of the first 4G BS.

In an embodiment, transferring, by the UE, the voice call from the Wi-Fi device to the first 4G BS of the one or more 4G BSs, includes: initiating, by the UE, an idle mode on the 5G BS, upon detecting that the strength of signals received from the 5G BS and the one or more 4G BSs meets the threshold condition, performing, by the UE, reselection to an optimal 4G BS of the one or more 4G BSs with a desired signal strength, and transferring, by the UE, the voice call from the Wi-Fi device to the optimal 4G BS.

In an example embodiment, the precondition associated with the RAT includes: the 5G BS not being supported for the voice call, the Wi-Fi device and the one or more 4G BSs being supported for the voice call, and the 5G BS, the Wi-Fi device and the one or more 4G BSs being supported for the voice call.

In an example embodiment, transferring, by the UE, the voice call from the Wi-Fi device to the first 4G BS of the one or more 4G BSs, includes: receiving, by the UE, a list of Inter Radio Access Technology (IRAT) 4G BSs from an idle/connected mode $N_{cell}$ database, upon detecting that the strength of the signal received from the Wi-Fi device is less than the rove-out threshold for handover and the strength of the signal received from the 5G BS is less than the fourth threshold signal strength, identifying, by the UE, a IRAT 4G BS from the list of IRAT 4G BSs with a signal strength meets a second threshold condition, and transferring, by the UE, the voice call from the Wi-Fi device to the IRAT 4G BS.

In an example embodiment, transferring, by the UE, the voice call from the Wi-Fi device to the IRAT 4G BS, includes: performing, by the UE, one of: transferring the voice call from the Wi-Fi device to the IRAT 4G BS during an Radio Resource Control (RRC) idle mode by performing an idle mode reselection to the IRAT 4G BS from the 5G BS based on a System Information Block (SIB), or transferring the voice call from the Wi-Fi device to the IRAT 4G BS during an RRC connected mode by sending the MR to the cellular network when the IRAT 4G BS is configured at the UE, or transferring the voice call from the Wi-Fi device to the IRAT 4G BS during the RRC connected mode by internally releasing a RRC connection and triggering the idle mode for doing reselection when the IRAT 4G BS is not configured at the UE.

In an example embodiment, transferring, by the UE, the voice call from the Wi-Fi device to the 5G BS includes: transferring, by the UE, the voice call from the Wi-Fi device to the 5G BS, upon detecting that the strength of the signal received from the Wi-Fi device is less than the fifth threshold signal strength, initiating, by the UE, a timer, determining, by the UE, whether a QoS is established on the 5G BS for the voice call, and terminating, by the UE, the timer and continuing the voice call over the 5G BS, upon determining that the QoS is established on the 5G BS for the voice call.

In an example embodiment, the method includes: performing, by the UE, an EPSFB procedure to transfer the voice call from the 5G BS to the 4G BS, upon determining that the QoS is not established on the 5G BS for the voice call, determining, by the UE, whether the EPSFB procedure is successful, and performing, by the UE, terminating the timer and transferring the voice call from the 5G BS to the 4G BS, upon determining that the EPSFB procedure is successful, or terminating, by the UE, the timer and continue the voice call over the 5G BS, upon determining that the EPSFB procedure is unsuccessful.

In an example embodiment, continuing the voice call over the 5G BS includes: establishing, by the UE, an internet Protocol Data Unit (PDU) session on the 5G BS, triggering, by the UE, to establish an Evolved Packet Data Gateway (ePDG)/Non-3GPP Interworking Function (N3IWF) on the 5G BS using an internet bearer, and performing, by the UE, one of: transferring the voice call to the Wi-Fi device, based on the ePDG/N3IWF not being established on the 5G BS, and transferring the voice call to the 5G BS, based on the ePDG/N3IWF being established on the 5G BS.

In an example embodiment, the method includes: shifting, by the UE, the IMS registration from the 5G BS to the 4G BS, upon determining that the signal strength of the 4G BS is greater than the signal strength of the Wi-Fi device; detecting, by the UE, the trigger for the voice call; and initiating, by the UE, the voice call over the 4G BS.

Accordingly, various example embodiments herein provide the UE for performing the voice call. The UE includes: a memory, and at least one processor coupled to the memory. The at least one processor is configured to: monitor events performed at the UE, where signals of a 5G BS, a 4G BS, and a Wi-Fi device are received at the UE, a voice call is preferred for the cellular network over the Wi-Fi network at the UE, an IMS is registered over the 5G BS, the 5G BS is not supported for the voice call, and the Wi-Fi device and the 4G BS are supported for the voice call. The at least one processor is configured to: detect the event related to the voice call; compare signal strength of the Wi-Fi device and signal strength of the 4G BS; shift the IMS registration from the 5G BS to the Wi-Fi device, upon determining that the signal strength of the Wi-Fi device is greater than the signal strength of the 4G BS; detect the trigger for the voice call; and initiate the voice call over the Wi-Fi device.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure, and the embodiments herein include all such modifications.

BRIEF DESCRIPTION OF THE DRAWINGS

This method and apparatus are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1A:
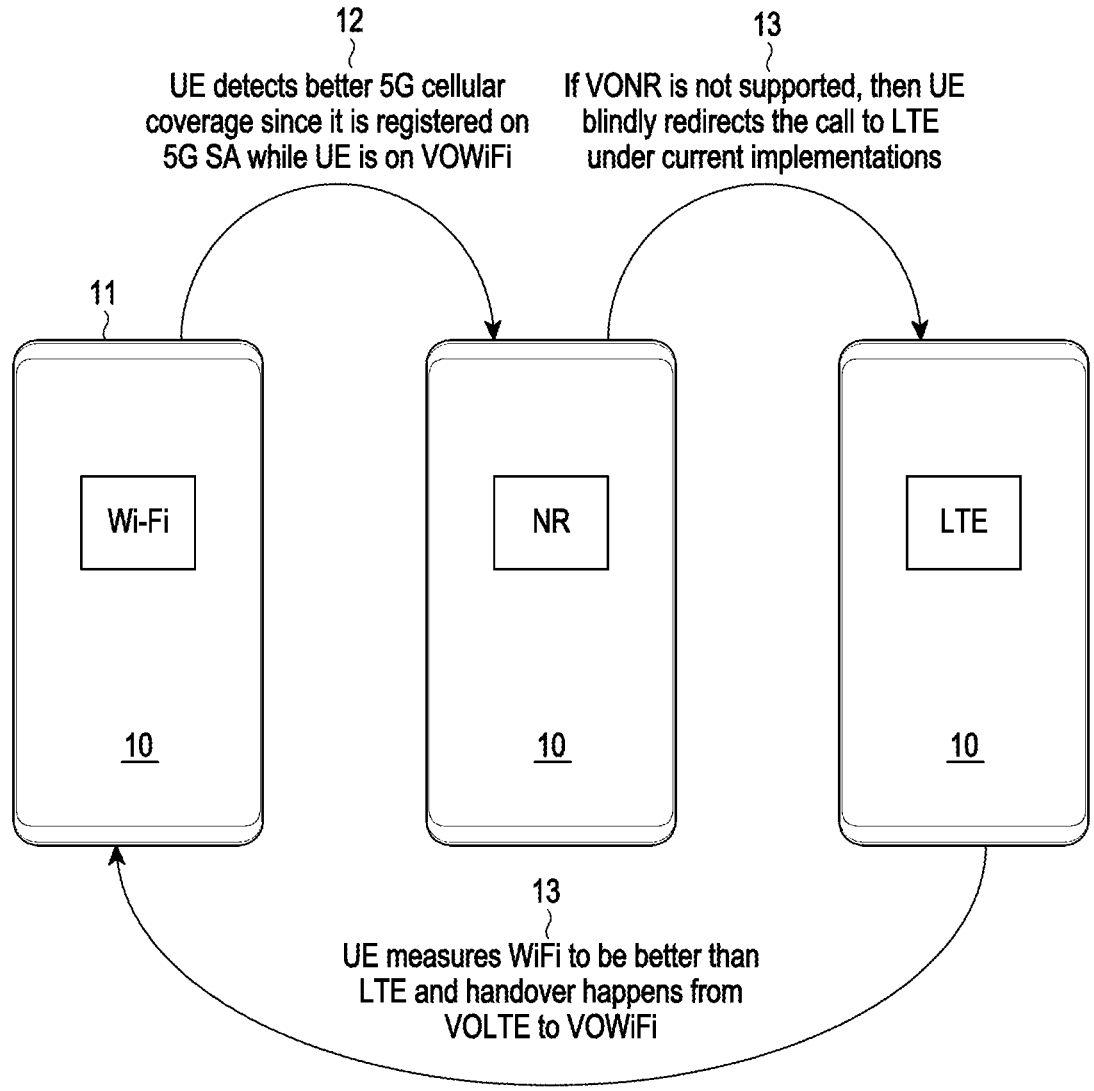
FIG. 1A is a diagram illustrating a conventional method of handling a voice call by a UE, according to prior art.
Figure 1B:
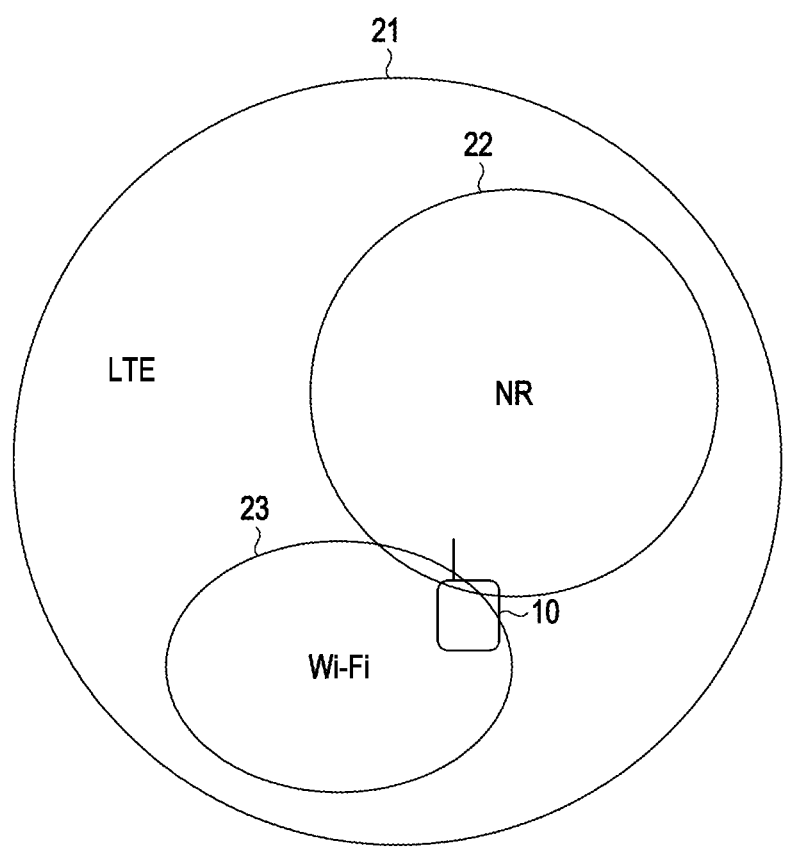
FIG. 1B is a diagram illustrating signal coverage area of the conventional wireless devices, according to prior art.

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the disclosure. Also, the various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the disclosure can be practiced. Accordingly, the examples should not be construed as limiting the scope of the disclosure.

Various example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be understood to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "5G" and "NR" are used interchangeably and may refer to the same thing, the terms "4G" and "LTE" are used interchangeably and may refer to the same thing, the terms "cell" and "BS" are used interchangeably and may refer to the same thing.

Accordingly, the various example embodiments herein provide a method for enhancing voice call performance by a User Equipment (UE). The method includes: monitoring, by the UE, events performing at the UE, wherein signals of a $5^{th}$ Generation (5G) Base Station (BS), a $4^{th}$ Generation (4G) BS, and a Wireless Fidelity (Wi-Fi) device are received at the UE, a voice call is preferred for a cellular network over a Wi-Fi network at the UE, an IMS is registered over the 5G BS, the 5G BS is not supported for the voice call, and the Wi-Fi device and the 4G BS are supported for the voice call; detecting, by the UE, an event related to the voice call; matching, by the UE, a strength of signals received from the Wi-Fi device and the 4G BS; shifting, by the UE, an IMS registration from the 5G BS to the Wi-Fi device, upon determining that the signal strength of the Wi-Fi device is greater than the signal strength of the 4G BS; detecting, by the UE, a trigger for the voice call; and initiating, by the UE, the voice call over the Wi-Fi device.

Accordingly, various example embodiments herein provide the UE for enhancing the voice call performance. The UE includes: a call shifting engine, a memory, a processor, where the voice call shifting engine is coupled to the memory and the processor. The voice call shifting engine is configured to: monitor the events performing at the UE, wherein the signals of the 5G BS, the 4G BS, and the Wi-Fi device are received at the UE, the voice call is preferred for the cellular network over the Wi-Fi network at the UE, the IMS is registered over the 5G BS, the 5G BS is not supported for the voice call, and the Wi-Fi device and the 4G BS are supported for the voice call; detect the event related to the voice call; match the strength of the signals received from the Wi-Fi device and the 4G BS; shift the IMS registration from the 5G BS to the Wi-Fi device, upon determining that the signal strength of the Wi-Fi device is greater than the signal strength of the 4G BS; detect the trigger for the voice call; and initiate the voice call over the Wi-Fi device.

The disclosed method allows the UE to avoid call failures or call drops either on a VOWiFi or a VONR or a VOLTE in presence of multitude of options. For example, for the UE which is configured with a cellular preferred mode, when multiple RATs are available, the disclosed method allows the UE in achieving better call sustainability by doing a look-up of other RAT options available.

Referring now to the drawings, and more particularly to FIGS. 2 through 9, there are shown various example embodiments.

Figure 2:
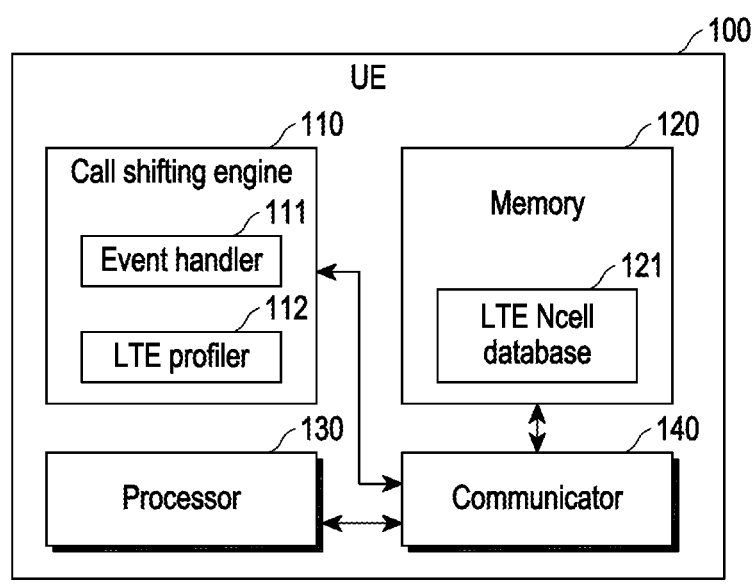
FIG. 2 is a block diagram illustrating an example configuration of a UE for enhancing voice call performance, according to various embodiments.

FIG. 2 is a block diagram illustrating an example configuration of a UE (100) for enhancing voice call performance, according to various embodiments. Examples of the UE (100) include, but are not limited to a smartphone, a tablet computer, a Personal Digital Assistance (PDA), a desktop computer, an Internet of Things (IoT), a wearable device, etc. In an embodiment, the UE (100) includes a call shifting engine (e.g., including various processing circuitry and/or executable program instructions) (110), a memory (120), a processor (e.g., including processing circuitry) (130), and a communicator (e.g., including communication circuitry) (140), where the voice call shifting engine (110) is coupled to the memory (120) and the processor (130). In an embodiment, the voice call shifting engine (110) includes an event handler (111), and a Long-Term Evolution (LTE) profiler (112). The voice call shifting engine (110), the event handler (111), the LTE profiler (112) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The voice call shifting engine (110) monitors events performing at the UE (100). Signals of a 5th Generation (5G) Base Station (BS), a 4th Generation (4G) BS, and a Wireless Fidelity (Wi-Fi) device are received at the UE (100). Examples of the events include, but are not limited to, opening a dialer of a calling application, browsing a contact list of the contact application, checking a missed call notification after a notification light turned on, receiving a birthday reminder, etc. A voice call is preferred for a cellular network over a Wi-Fi network at the UE (100). An Internet protocol Multimedia Subsystem (IMS) is registered over the 5G BS. In an embodiment, the 5G BS is not supported for the voice call, and the Wi-Fi device and the 4G BS are supported for the voice call. The voice call shifting engine (110) detects an event related to the voice call. The voice call shifting engine (110) matches a strength of the signals received from the Wi-Fi device and the 4G BS. The voice call shifting engine (110) shifts an IMS registration from the 5G BS to the Wi-Fi device, upon determining that the signal strength of the Wi-Fi device is greater than the signal strength of the 4G BS. The voice call shifting engine (110) detects a trigger for the voice call. The voice call shifting engine (110) initiates the voice call over the Wi-Fi device. The voice call shifting engine (110) disables a cellular Key Performance Indicator (KPI) measurement till end of the voice call, upon initiating the voice call.

In an embodiment, the voice call shifting engine (110) detects a precondition associated with a Radio Access Technology (RAT). A precondition associated with the RAT: the 5G BS is not supported for the voice call, and the Wi-Fi device and one or more 4G BSs are supported for the voice call. Another precondition associated with the RAT: the 5G BS, the Wi-Fi device and the one or more 4G BSs are supported for the voice call. Further, the voice call shifting engine (110) detects either a strength of the signals received from the 5G BS and the one or more 4G BSs meet a first threshold condition, or the strength of the signal received from the 5G BS is less than a fourth threshold signal strength, or a strength of the signal received from the Wi-Fi device is less than a rove-out threshold for handover, and the strength of the signal received from the Wi-Fi device is less than a fifth threshold signal strength. Further, the voice call shifting engine (110) transfers the voice call from the Wi-Fi device to the 5G BS or a first 4G BS of the one or more 4G BSs. In an embodiment, the voice call shifting engine (110) disables a 5G Stand Alone (SA) measurement till end of the voice call, upon transferring the voice call to the first 4G BS.

In an embodiment, the voice call shifting engine (110) detects that the strength of the signal received from the 5G BS is greater than a first threshold signal strength. Further, the voice call shifting engine (110) determines the strength of the signal received from the one or more 4G BSs by performing a LTE profiling with a period, wherein the period is determined based on UE parameters (e.g. mobility state of the UE, UE battery charge availability). Further, the voice call shifting engine (110) detects that the strength of the signals received from the one or more 4G BSs is greater than a second threshold signal strength, where the second threshold signal strength is greater than or equal to the first threshold signal strength.

In an embodiment, the voice call shifting engine (110) transfers the voice call from the Wi-Fi device to the 5G BS, upon detecting that the strength of signals received from the 5G BS and the one or more 4G BSs meets the first threshold condition. Further, the voice call shifting engine (110) sends a Measurement Report (MR) to an optimal 4G BS of the one or more 4G BSs to aid the cellular network in a proper redirection. Further, the voice call shifting engine (110) transfers the voice call from the 5G BS to the first 4G BS or the optimal 4G BS based on a redirection from the cellular network.

In an embodiment, the voice call shifting engine (110) checks whether the strength of the signal received from the first 4G BS is less than a third threshold signal strength upon transferring the voice call from the 5G BS to the first 4G BS. Further, the voice call shifting engine (110) continues the voice call on the first 4G BS, upon determining that the strength of the signal received from the first 4G BS is not less than the third threshold signal strength. Further, the voice call shifting engine (110) transfers the voice call from the first 4G BS to the Wi-Fi device or a second 4G BS, upon determining that the strength of the signal received from the first 4G BS is less than the third threshold signal strength, where the second 4G BS has the signal strength better than the signal strength of the first 4G BS.

In an embodiment, the voice call shifting engine (110) initiates an idle mode on the 5G BS, upon detecting that the strength of signals received from the 5G BS and the one or more 4G BSs meets the threshold condition. Further, the voice call shifting engine (110) performs reselection to an optimal 4G BS of the one or more 4G BSs with a desired signal strength. Further, the voice call shifting engine (110) transfers the voice call from the Wi-Fi device to the optimal 4G BS.

In an embodiment, the voice call shifting engine (110) receives a list of Inter Radio Access Technology (IRAT) 4G BSs from an idle/connected mode Ncell database (121), upon detecting that the strength of the signal received from the Wi-Fi device is less than the rove-out threshold for handover and the strength of the signal received from the 5G BS is less than the fourth threshold signal strength. Further, the voice call shifting engine (110) identifies an IRAT 4G BS from the list of IRAT 4G BSs with a signal strength that meets a second threshold condition. Further, the voice call shifting engine (110) transfers the voice call from the Wi-Fi device to the IRAT 4G BS.

In an embodiment, the voice call shifting engine (110) transfers the voice call from the Wi-Fi device to the IRAT 4G BS during an RRC idle mode by performing an idle mode reselection to the IRAT 4G BS from the 5G BS based on a System Information Block (SIB). In another embodiment, the voice call shifting engine (110) transfers the voice call from the Wi-Fi device to the IRAT 4G BS during an RRC connected mode by sending a MR to the cellular network when the IRAT 4G BS is configured at the UE (100). In another embodiment, the voice call shifting engine (110) transfers the voice call from the Wi-Fi device to the IRAT 4G BS during the RRC connected mode by internally releasing a RRC connection and triggering the idle mode for doing reselection when the IRAT 4G BS is not configured at the UE (100).

In an embodiment, the voice call shifting engine (110) transfers the voice call from the Wi-Fi device to the 5G BS, upon detecting that the strength of the signal received from the Wi-Fi device is less than the fifth threshold signal strength. Further, the voice call shifting engine (110) initiates a timer. Further, the voice call shifting engine (110) determines whether a QoS is established on the 5G BS for the voice call. Further, the voice call shifting engine (110) terminates the timer and continues the voice call over the 5G BS, upon determining that the QoS is established on the 5G BS for the voice call.

In an embodiment, the voice call shifting engine (110) performs an EPSFB procedure to transfer the voice call from the 5G BS to the 4G BS, upon determining that the QoS is not established on the 5G BS for the voice call. Further, the voice call shifting engine (110) determines whether the EPSFB procedure is successful. The voice call shifting engine (110) terminates the timer and transfers the voice call from the 5G BS to the 4G BS, upon determining that the EPSFB procedure is successful. The voice call shifting engine (110) terminates the timer and continues the voice call over the 5G BS, upon determining that the EPSFB procedure is unsuccessful.

In an embodiment, the voice call shifting engine (110) establishes an internet Protocol Data Unit (PDU) session on the 5G BS. Further, the voice call shifting engine (110) triggers to establish an Evolved Packet Data Gateway (ePDG)/Non-3GPP Interworking Function (N3IWF) on the 5G BS using an internet bearer. The voice call shifting engine (110) transfers the voice call to the Wi-Fi device, when the ePDG/N3IWF is not established on the 5G BS. The voice call shifting engine (110) transfers the voice call to the 5G BS, when the ePDG/N3IWF is established on the 5G BS.

In an embodiment, the voice call shifting engine (110) shifts the IMS registration from the 5G BS to the 4G BS, upon determining that the signal strength of the 4G BS is greater than the signal strength of the Wi-Fi device. Further, the voice call shifting engine (110) detects the trigger for the voice call. Further, the voice call shifting engine (110) initiates the voice call over the 4G BS upon detecting the trigger for the voice call.

The memory (120) includes an LTE Ncell Database (LTE Ncell DB) (121) containing a list of LTE Ncells near to the UE (100). The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the UE (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The processor (130) and the call shifting engine (110) may be integrally referred to as at least one processor. The communicator (140) is configured for communicating internally between hardware components in the UE (100). Further, the communicator (140) is configured to facilitate the communication between the UE (100) and other devices via one or more networks (e.g. Radio technology). The communicator (140) includes an electronic circuit specific to a standard that enables wired or wireless communication.

Although FIG. 2 shows the hardware components of the UE (100) but it is to be understood that various embodiments are not limited thereon. In various embodiments, the UE (100) may include less or a greater number of components. Further, the labels or names of the components are used only for illustrative purpose and does not limit the scope of the disclosure. One or more components can be combined together to perform same or substantially similar function for enhancing the voice call performance.

Figure 3:
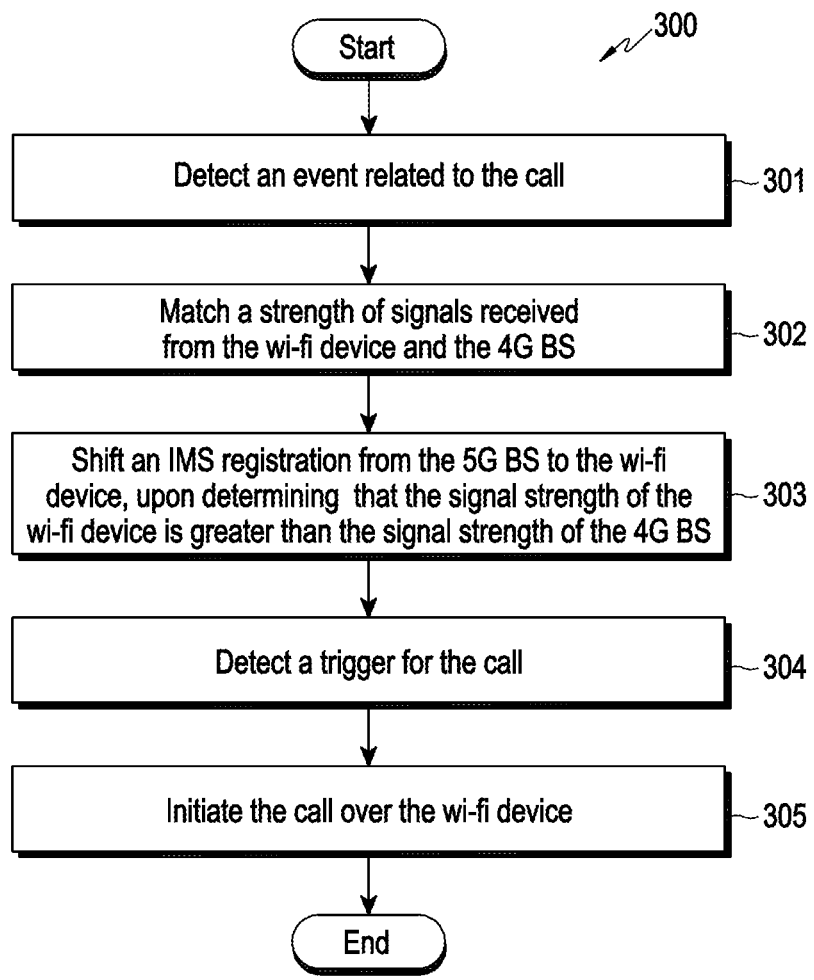
FIG. 3 is a flowchart illustrating an example method for enhancing the voice call performance, according to various embodiments.

FIG. 3 is a flowchart (300) illustrating an example method for enhancing the voice call performance, according to various embodiments. In an embodiment, the method allows the voice call shifting engine (110) to perform operations 301-305 of the flow diagram (300). At operation 301, the method includes detecting the event related to the voice call. At operation 302, the method includes matching the strength of signals received from the Wi-Fi device and the 4G BS. At operation 303, the method includes shifting the IMS registration from the 5G BS to the Wi-Fi device, upon determining that the signal strength of the Wi-Fi device is greater than the signal strength of the 4G BS. At operation 304, the method includes detecting the trigger for the voice call. At operation 305, the method includes initiating the voice call over the Wi-Fi device.

Figure 4:
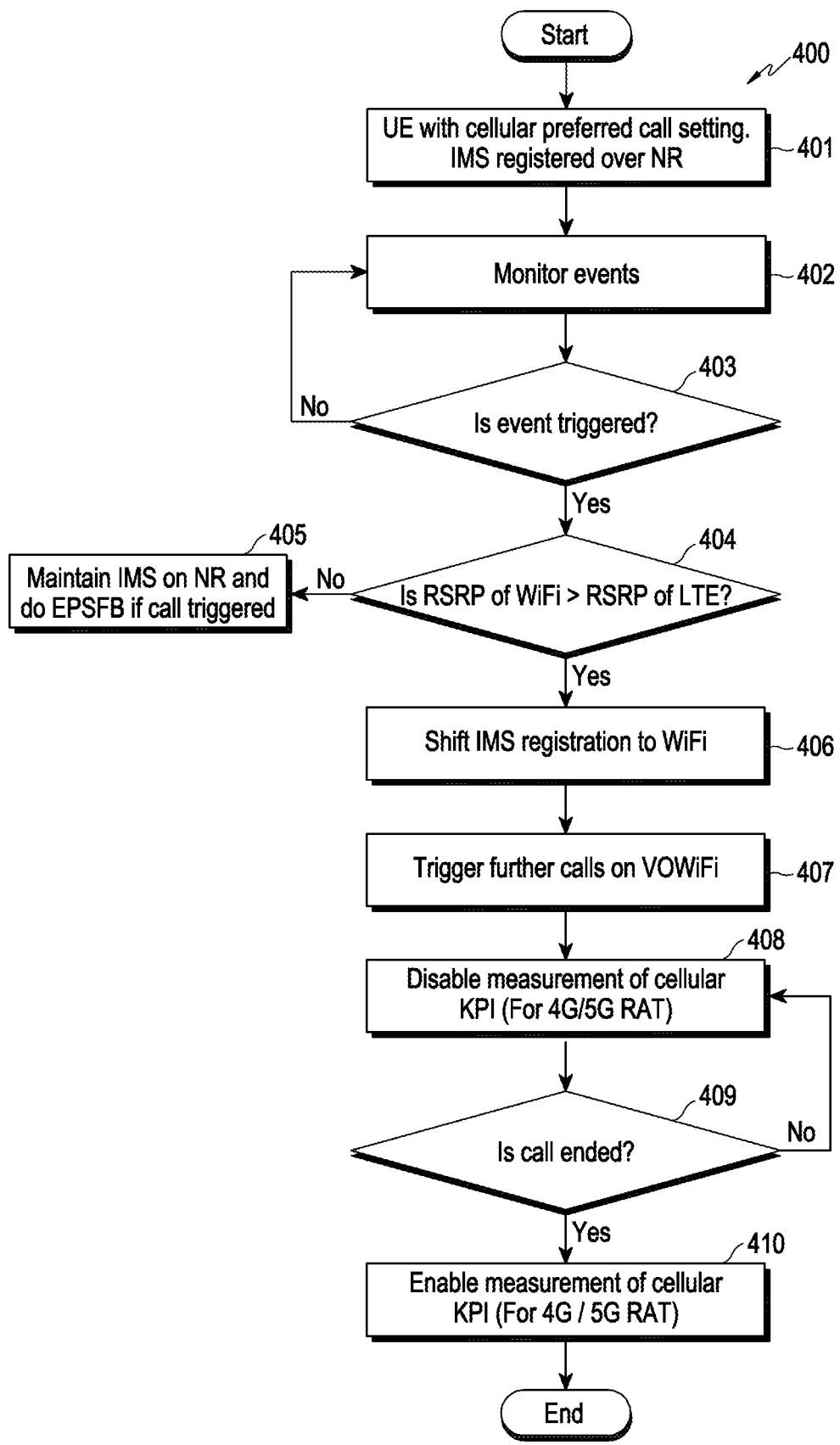
FIG. 4 is a flowchart illustrating an example method for shifting an IMS registration from a 5G BS to a Wi-Fi device, according to various embodiments.

FIG. 4 is a flowchart (400) illustrating an example method for shifting the IMS registration from the 5G BS to the Wi-Fi device upon determining that the signal strength of the Wi-Fi device is greater than the signal strength of the 4G BS even the voice call is preferred for the cellular network over the Wi-Fi network, according to various embodiments. At operation 401, the UE (100) is configured with a cellular preferred call setting over the Wi-Fi network, and the IMS is registered over New Radio (NR) BS, but the NR BS is not supported for Voice Over NR (VONR). The Wi-Fi device and the 4G BS support Voice Over Wi-Fi (VOWiFi) and Voice Over LTE (VOLTE) respectively. In a cellular preferred mode, the IMS registration will be over the NR BS if the NR BS signal strength is strong, e.g., the signal strength of the NR BS is more than a minimum signal threshold. At operation 402, the event handler (111) of the UE (100) monitors the events like opening the dialer of the voice calling application, browsing the contact list of the contact application, checking the missed call notification after the notification light turned on, receiving the birthday reminder, etc.

At operation 403, the UE (100) detects whether the event is triggered. A user takes 2-3 seconds to trigger the voice call after the event is invoked. Upon triggering the event, the UE (100) identifies that the user is planning to initiate a voice call. At operation 404, due to not supporting the VONR, the UE (100) compares the signal strengths (e.g. Reference Signal Received Power (RSRP) of the Wi-Fi device and the 4G BS in background. At operation 405, if the signal strength of the Wi-Fi device is not greater than the signal strength of the 4G BS, the UE (100) maintains the IMS registration on the NR BS and does the EPSFB if the voice call is triggered. At operation 406, if the Wi-Fi signal strength is greater than the LTE BS signal strength, then the UE (100) immediately registers the IMS over the Wi-Fi device which takes less than one second in good Wi-Fi coverage. At operation 407, the UE (100) triggers VOWiFi call instead of performing the EPSFB from the NR BS. At operation 408, the UE (100) continues the VOWiFi call and disables measurement of cellular KPIs for 4G/5G RAT until the voice call is ongoing. At operations 409 and 410, the UE (100) enables the measurement of the cellular KPIs for the 4G/5G RAT after ending the voice call.

Figure 5:
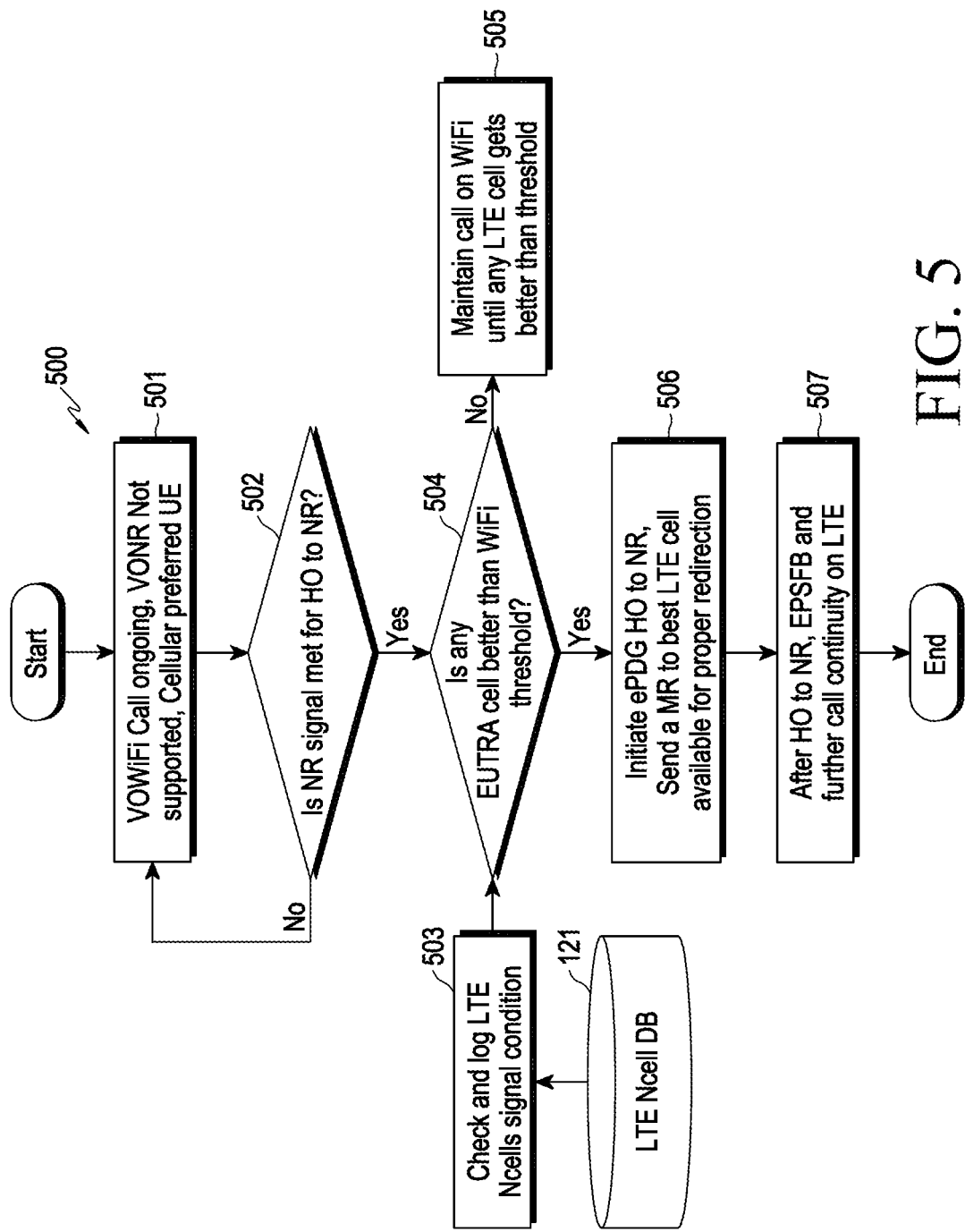
FIG. 5 is a flowchart illustrating an example method for transferring the voice call from the 5G BS to the Wi-Fi device or the 4G BS when VONR is not supported by the 5G BS, according to various embodiments.

FIG. 5 is a flowchart (500) illustrating an example method for transferring the voice call from the 5G BS to the Wi-Fi device or the 4G BS when the VONR is not supported by the 5G BS, according to various embodiments. At operation 501, the NR BS is not supported for the VONR. The UE (100) is configured with the cellular preferred call setting over the Wi-Fi network. The Wi-Fi device and the 4G BS supports the VOWiFi and the VOLTE respectively. Consider, the VOWiFi call is ongoing from the UE (100), then the UE (100) should not trigger Handover (HO) to the NR BS when the NR signal conditions are better than a threshold as the VONR is not supported. At operation 502, the UE (100) checks whether the NR BS signal is met for the HO to the NR BS by determining whether the strength of the signal received from the 5G BS is greater than the first threshold signal strength. At operation 503, the LTE profiler (112) of the UE (100) performs the periodic LTE profiling with a variable periodicity to keep checking available EUTRA conditions. The periodicity of the LTE measurement has to be power-optimized to avoid power wastage. If a UE battery charge availability less than 20%, then the periodicity is set to 10 seconds. If the UE battery charge availability greater than 60%, then the periodicity is set to 1 second. If the UE (100) is stationary, then the periodicity is set to 10 seconds. If the UE (100) is moving, then the periodicity is set to 2 seconds.

The LTE profiler (112) checks and logs the LTE Ncell's signal condition from the LTE Ncell DB (121), where the LTE Ncell DB (121) is updated from a System Information Block (SIB) or a connected mode measurement-object (measObject) configured in the RRC connected mode by the LTE BS (e.g., eNB or NR BS (e.g., gNB). At operation 504, the UE (100) checks whether the EUTRA signal strength is better than the Wi-Fi signal when the NR BS signal is met for the HO to the NR BS by determining whether the strength of signals received from the 4G BS is greater than the second threshold signal strength. At operation 505, the UE (100) maintains the voice call on the Wi-Fi network until any LTE cell gets better than the threshold if the EUTRA signal strength is not better than the Wi-Fi signals. At operation 506, if the EUTRA signal strength is better than the Wi-Fi signals and the expected threshold, the UE (100) initiates the ePDG HO to the NR BS, sends the MR to best LTE cell available for proper redirection by triggering the MR with the best LTE PCI information to aid network in proper redirection and avoid EPSFB to undesirable E-UTRA Absolute Radio Frequency Channel Number (EARFCN). This is particularly important if the UE (100) measures multiple LTE EARFCN with different Received Signal Strength Indicators (RSSIs). At operation 507, the UE (100) initiates the voice call transfer to the NR BS, then performs the EPSFB to the LTE BS and further call continuity on the LTE BS.

Figure 6:
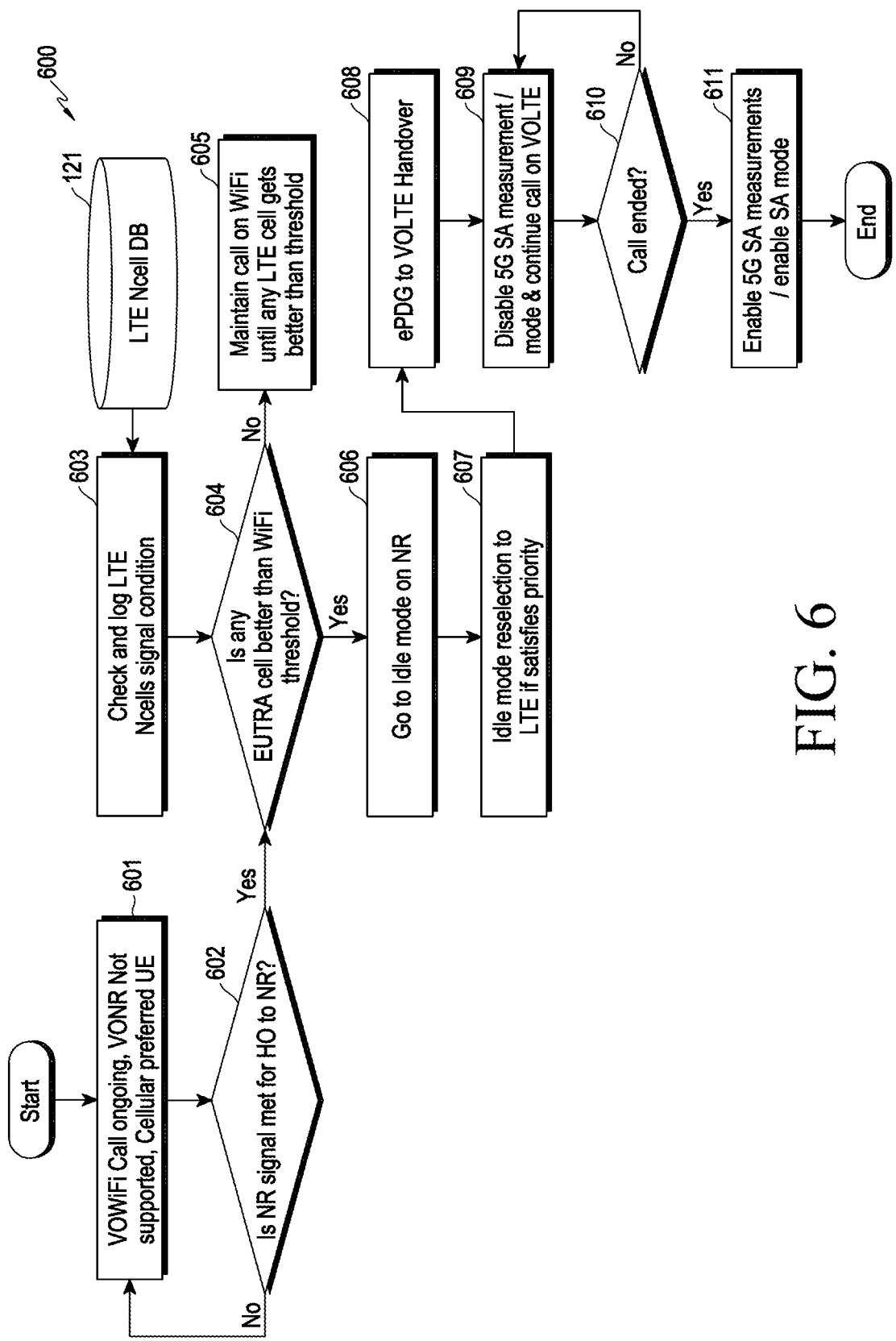
FIG. 6 is a flowchart illustrating an example method for transferring the voice call from the 5G BS to the Wi-Fi device or the 4G BS when VONR is not supported by the 5G BS, according to various embodiments.

FIG. 6 is a flowchart (600) illustrating an example method for transferring the voice call from the 5G BS to the Wi-Fi device or the 4G BS when the VONR is not supported by the 5G BS, according to various embodiments. At operation 601, the NR BS is not support for the VONR. The UE (100) is configured with the cellular preferred call setting over the Wi-Fi network. The Wi-Fi device and the 4G BS supports the VOWiFi and the VOLTE respectively. Consider, the VOWiFi call is ongoing from the UE (100), then the UE (100) should not trigger the HO to the NR BS when the NR signal conditions are better than threshold as the VONR is not supported. At operation 602, the UE (100) checks whether the NR BS signal is met for the HO to the NR BS by determining whether the strength of the signal received from the 5G BS is greater than the first threshold signal strength. At operation 603, the LTE profiler (112) of the UE (100) performs the periodic LTE profiling with the variable periodicity to keep checking available EUTRA conditions.

The LTE profiler (112) checks and logs the LTE Ncell's signal condition from the LTE Ncell DB (121), where the LTE Ncell DB (121) is updated from the SIB or the connected mode measObject. At operation 604, the UE (100) checks whether the EUTRA signal strength is better than the Wi-Fi signal when the NR BS signal is met for the HO to the NR BS by determining whether the strength of signals received from the 4G BS is greater than the second threshold signal strength. At operation 605, the UE (100) maintains the voice call on the Wi-Fi network until any LTE cell gets better than the threshold if the EUTRA signal strength is not better than the Wi-Fi signals. At operation 606, if the EUTRA signal strength is better than the Wi-Fi signals and the expected threshold, the UE (100) goes to the idle mode on the NR BS. At operation 607, the UE (100) performs a silent idle mode reselection to a desired LTE EARFCN which is measured to be suitable, which helps to reduce HO latency due to the EPSFB and avoid blind redirection to random LTE frequency. Also, if the 5G signal conditions are bad to support the EPSFB signalling due to Uplink (UL) Block Error Rate (BLER), then problems such as a late redirection of the voice call can be avoided using the disclosed method. At operations 608 and 609, the UE (100) performs the ePDG to VOLTE handover, disables the 5G SA measurement/mode for saving the power until the voice call is ongoing, and continues the voice call on the VOLTE. At operations 610 and 611, the UE (500) re-enables the 5G SA measurement/mode to move back to the 5G BS upon detecting the end of the voice call.

Figure 7:
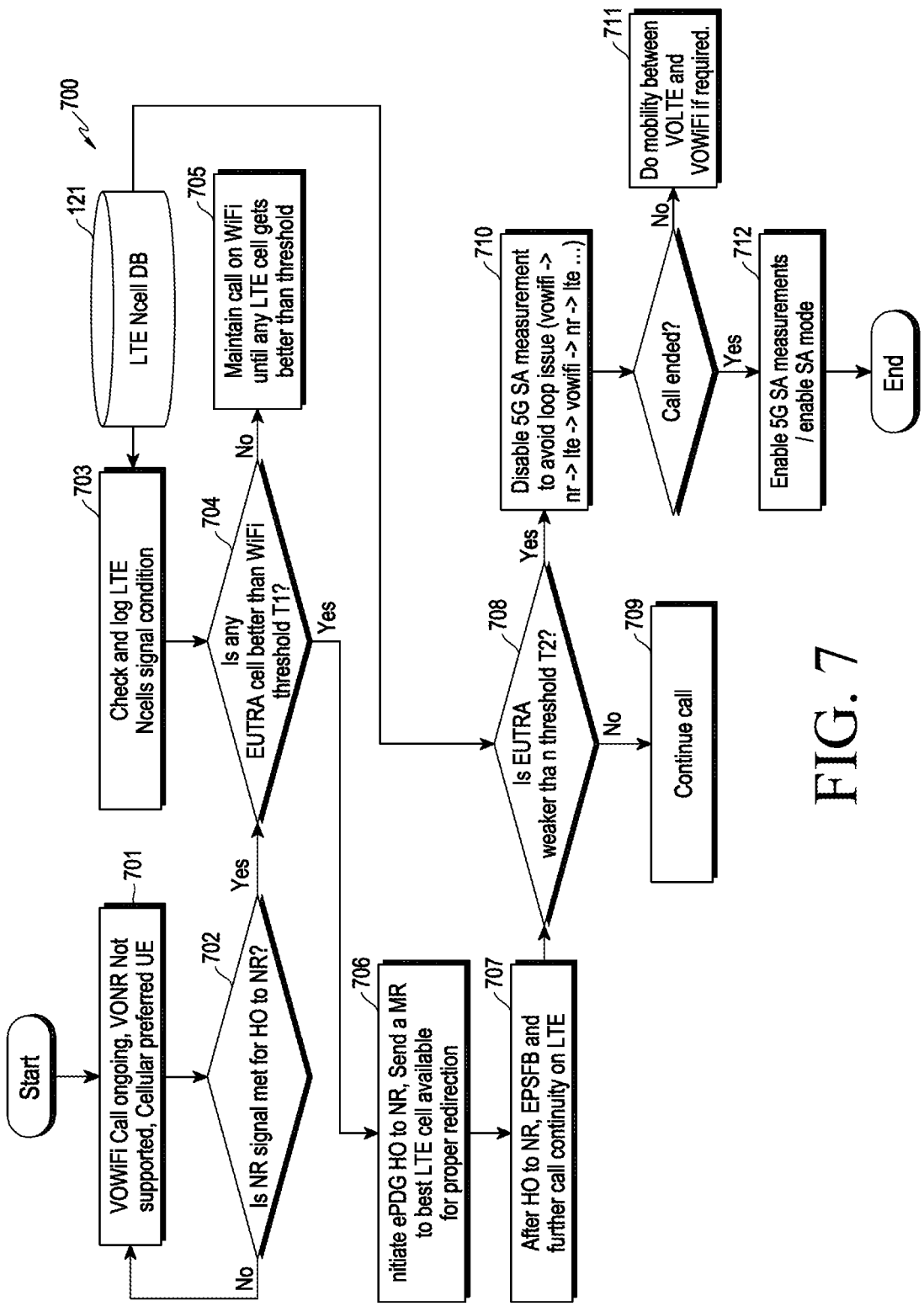
FIG. 7 is a flowchart illustrating an example method for transferring the voice call from the 5G BS to the Wi-Fi device or the 4G BS based on signal thresholds when VONR is not supported by the 5G BS, according to various embodiments.

FIG. 7 is a flowchart (700) illustrating an example method for transferring the voice call from the 5G BS to the Wi-Fi device or the 4G BS based on signal thresholds when the VONR is not supported by the 5G BS, according to various embodiments. At operation 701, the NR BS is not supported for the VONR. The UE (100) is configured with the cellular preferred call setting over the Wi-Fi network. The Wi-Fi device and the 4G BS supports the VOWiFi and the VOLTE respectively. Consider, the VOWiFi call is ongoing from the UE (100), then the UE (100) should not trigger the HO to the NR BS when the NR signal conditions are better than threshold as the VONR is not supported. At operation 702, the UE (100) checks whether the NR BS signal is met for the HO to the NR BS by determining whether the strength of the signal received from the 5G BS is greater than the first threshold signal strength. At operation 703, the LTE profiler (112) of the UE (100) performs the periodic LTE profiling with the variable periodicity to keep checking available EUTRA conditions. The LTE profiler (112) checks and logs the LTE Ncell's signal condition from the LTE Ncell DB (121), where the second threshold signal strength is greater than or equal to the first threshold signal strength, where the LTE Ncell DB (121) is updated from the SIB or the connected mode measObject. At operation 704, the UE (100) checks whether the EUTRA signal strength is better than the Wi-Fi signal threshold T1 (e.g., second threshold signal strength) when the NR BS signal is met for the HO to the NR BS. At operation 705, the UE (100) maintains the voice call on the Wi-Fi network until any LTE cell gets better than threshold T1 if the EUTRA signal strength is not better than the Wi-Fi signal threshold T1.

Most operators are following blind redirection to the LTE BS during the EPSFB instead of the MR based procedure. The UE (100) is not aware if the VONR is supported in the network. If the UE (100) measures multiple EUTRA frequencies out of which only a few are desirable, it cannot control the redirection parameter by the network. The network might end up the EPSFB to some poor EUTRA frequency with lower RSSI than a threshold RSSI which will force the UE (100) to go back to the VOWiFi since the Wi-Fi signal is still stronger. In blind mode redirection method, simple LTE profiling is not useful since the network is unaware of a cell with a strong signal.

At operation 706, if the EUTRA signal strength is better than the Wi-Fi signals and the expected threshold, the UE (100) initiates the ePDG HO to the NR BS, sends the MR to the best LTE cell available for proper redirection by triggering the MR with the best LTE PCI information to aid the network in proper redirection and avoid the EPSFB to the undesirable EARFCN. This is particularly important if the UE (100) measures multiple LTE EARFCN with different RSSIs. At operation 707, the UE (100) initiates the voice call transfer to the NR BS, then performs the EPSFB to the LTE BS, and further continues the voice call on the LTE BS. At operation 708, the UE (100) checks whether the EUTRA signal strength is weaker than the Wi-Fi signal threshold T2 (e.g., third threshold signal strength). At operation 709, the UE (100) continue the voice call on the LTE BS if the EUTRA signal strength is not weaker than the Wi-Fi signal threshold T2. At operation 710, the UE (100) disables the 5G SA measurement to avoid loop issues (e.g., Wi-Fi to NR to LTE to Wi-Fi . . . ) after the first EPSFB to ensure that the VONR is not supported in the 5G BS and the network is using the EPSFB for the voice call connection on the LTE BS to avoid a loop issue until the voice call continues, if the EUTRA signal strength is weaker than the Wi-Fi signal threshold T2. If other good EUTRA frequencies are available, then the UE (100) performs a connected mode HO to them or returns to the VOWiFi if no measurement object is configured by the network for intra RAT HO. At operation 711, the UE (100) can continue the VOWiFi after one loop instance or do VOWiFi to VOLTE HO to best PCI which is seamless until the voice call continues. At operation 712, the UE (500) enables the 5G SA measurement/mode to move back to the 5G BS upon detecting the end of the voice call.

Figure 8:
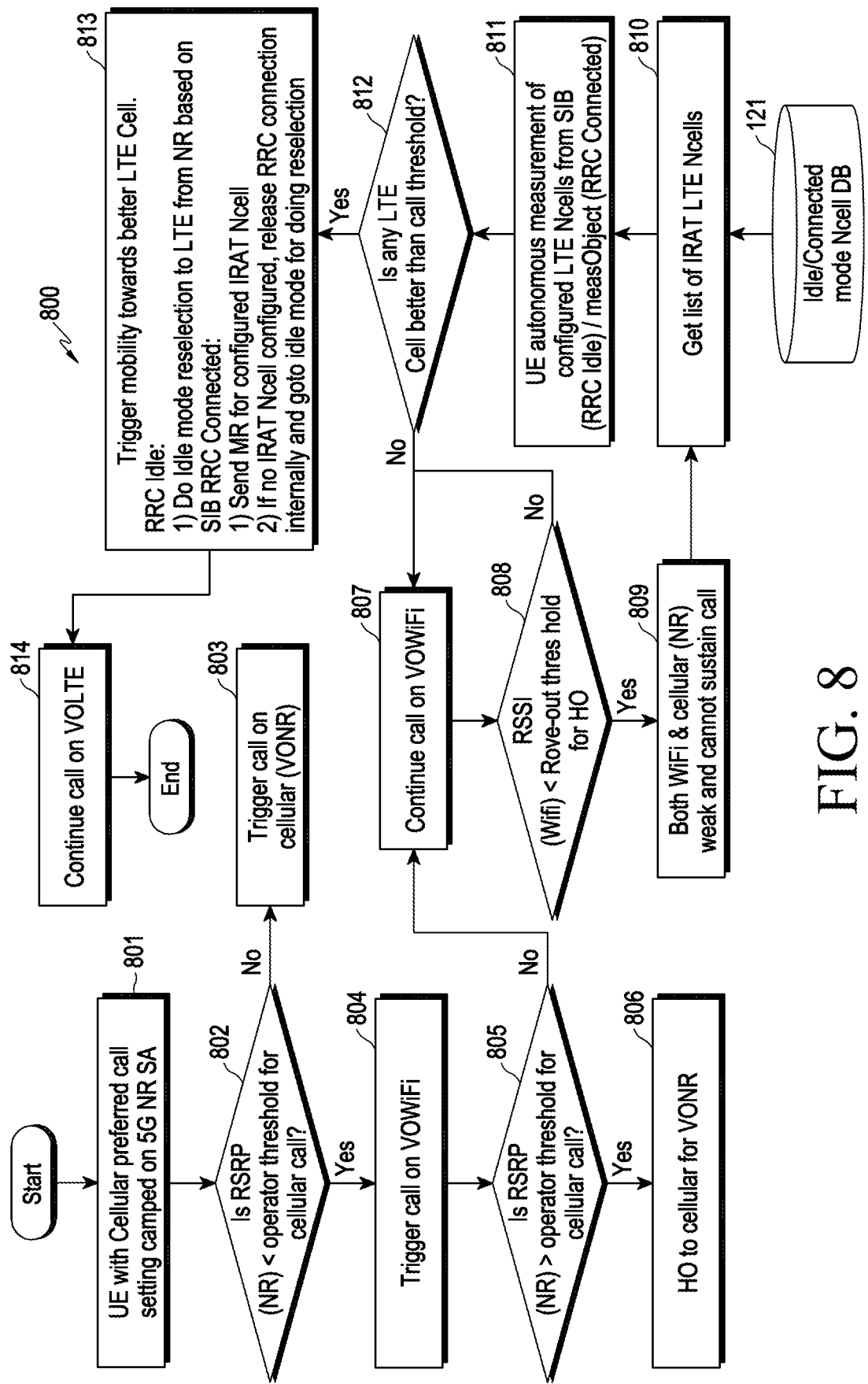
FIG. 8 is a flowchart illustrating an example method for transferring the voice call from the 5G BS to the Wi-Fi device or the 4G BS due to low signal strength of the 5G BS, according to various embodiments.

FIG. 8 is a flowchart (800) illustrating an example method for transferring the voice call from the 5G BS to the Wi-Fi device or the 4G BS due to the low signal strength of the 5G BS, according to various embodiments. At operation 801, the NR BS supports the VONR. The UE (100) is configured with the cellular preferred call setting, where the UE (100) is camped on 5G NR SA. At operation 802, the UE (100) checks whether the RSRP of the signal from the NR BS is less than an operator threshold for the cellular call. At operation 803, the UE (100) triggers the voice call on the VONR if the RSRP of the signal from the NR BS is greater than the operator threshold. At operation 804, the UE (100)

triggers the voice call on the VOWiFi if the RSRP of the signal from the NR BS is less than the operator threshold. At operation 805, the UE (100) checks whether the RSRP of the signal from the NR BS is greater than the operator threshold for the cellular call. At operation 806, the UE (100) triggers the voice call on the VONR if the RSRP of the signal from the NR BS is greater than the operator threshold. At operation 807, the UE (100) continues the voice call on the VOWiFi if the RSRP of the signal from the NR BS is less than the operator threshold for the cellular call. At operation 808, the UE (100) checks whether the RSSI of the Wi-Fi signal is less than the rove-out threshold for the HO. At operation 809, the UE (100) detects that both the Wi-Fi signal and the NR signals are weak and cannot sustain the voice call when the RSSI of the Wi-Fi signal is less than the rove-out threshold for the HO. The UE (100) detects that the NR signal is weak by identifying that the strength of the signal received from the 5G BS is less than the fourth threshold signal strength. The UE (100) continues the voice call on the VOWiFi when the RSSI of the Wi-Fi signal is not less than the rove-out threshold for the HO.

At operation 810, the UE (100) gets the list of IRAT LTE Ncells from the idle/connected mode Ncell DB (121). At operation 811, the UE (100) autonomously measures the configured LTE Ncells from SIB (RRC idle mode)/measObject (RRC connected mode). At operation 812, the UE (100) checks whether any LTE cell is better than the voice call threshold. The UE (100) measures the signal strength from the LTE BS which is better than the cellular specified threshold while the NR signal strength is below the threshold by identifying the IRAT 4G BS from the list of IRAT 4G BSs with the signal strength meets the second threshold condition. At operation 813, the UE (100) triggers the mobility towards a better LTE cell. In the RRC idle mode, the UE (100) does an idle mode reselection to the LTE BS from the NR BS based on the SIB. In the RRC connected, the UE (100) sends the MR for configured IRAT Ncell if no IRAT Ncell is configured, releases the RRC connection internally, and goes to the idle mode for doing reselection. Since QoEs of the VOLTE and the VONR are similar, the UE (100) triggers the HO to the VONR followed by connected mode HO to the VOLTE via B1/2 MR. Alternately, the UE (100) can do silent idle mode reselection to the best LTE frequency available and trigger a VOWiFi to VOLTE HO or disable the 5G to trigger the VOWiFi to VOLTE HO, which ensures the cellular treatment given to the voice as per mode preference and operators will appreciate this. At 814, the UE (100) continues the voice call on the VOLTE.

Figure 9:
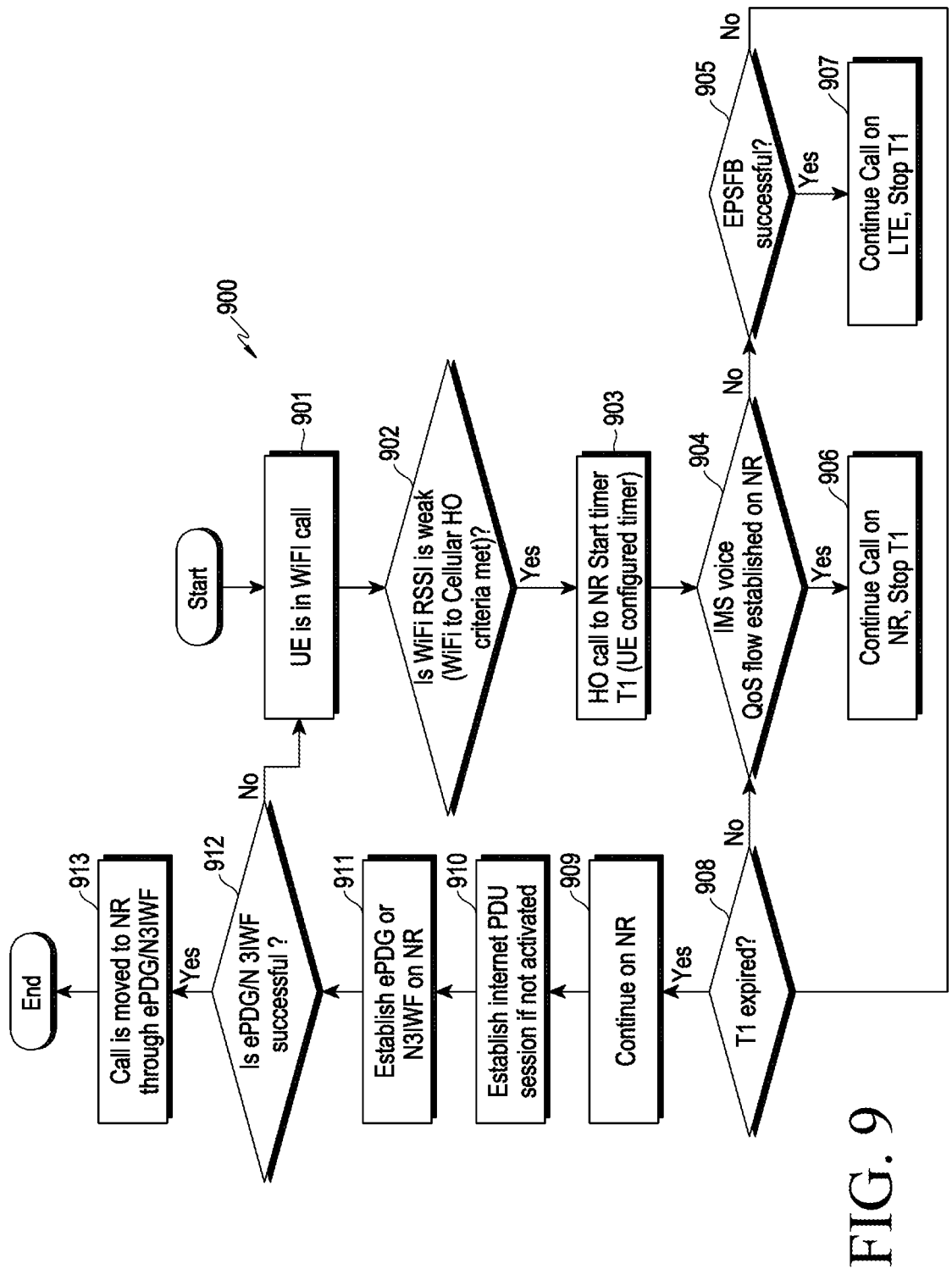
FIG. 9 is a flowchart illustrating an example method for transferring the voice call from the Wi-Fi device to the 4G BS or the 5G BS due to low signal strength of the Wi-Fi device, according to various embodiments.

FIG. 9 is a flowchart (900) illustrating an example method for transferring the voice call from the Wi-Fi device to the 4G BS or the 5G BS due to the low signal strength of the Wi-Fi device, according to various embodiments. Consider, the NR BS supports the VONR. The UE (100) is configured with the cellular preferred call setting over the Wi-Fi network. At operation 901, the VOWiFi call is ongoing from the UE (100). At operations 902 and 903, the UE (100) detects that the Wi-Fi signal is weak and the UE (100) is expecting the HO to the cellular. The UE (100) transfers the call from the Wi-Fi device to the 5G BS, upon detecting that the strength of the signal received from the Wi-Fi device is less than the fifth threshold signal strength. When HO to the cellular is triggered, the UE (100) starts the user-defined timer T1. At operation 904, while the timer is running, the UE (100) tries to acquire the VONR cell and establishes the QoS on the NR for the VONR call. At operation 905, if the VONR cell is not found, then the UE (100) tries to perform the EPSFB and continues the voice call on the LTE cell. At operations 906 and 907, the UE (100) stops the timer T1 if the UE (100) finds the NR cell for the VONR or the LTE cell for the VOLTE. At operations 908, 909 and 910, when the EPSFB is a failure and the timer is expired, then the UE (100) establishes the internet PDN on the NR cell if not already available. At operation 911, the UE (100) establishes the ePDG or N3IWF on the NR cell using internet bearer of the NR cell. At operations 912 and 913, if the ePDG/N3IWF is successful, then the UE (100) shifts the voice call to the NR through the ePDG/N3IWF. If the ePDG/N3IWF is not successful, then the UE (100) continues the voice call on Wi-Fi network.

The various actions, acts, blocks, steps, or the like in the various flowcharts (300-900) may be performed in the order presented, in a different order, or simultaneously. Further, in various embodiments, some of the actions, acts, blocks, steps, or the like may be omitted, added, modified, skipped, or the like without departing from the scope of the disclosure.

The embodiments disclosed herein can be implemented using at least one hardware device and performing network management functions to control the elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for performing voice call by a User Equipment (UE), comprises:
   performing an Internet protocol Multimedia Subsystem (IMS) registration with a $5^{th}$ Generation (5G) Base Station (BS);
   detecting an event related to a voice call while the IMS registration is with the 5G BS;
   comparing signal strength of a Wireless Fidelity (Wi-Fi) device and signal strength of a $4^{th}$ Generation (4G) Base Station (BS) based on detecting the event related to the voice call;
   shifting the IMS registration from the 5G BS to the Wi-Fi device, upon determining that the signal strength of the Wi-Fi device is greater than the signal strength of the 4G BS;
   detecting a trigger for the voice call after shifting the IMS registration from the 5G BS to the Wi-Fi device; and
   initiating the voice call over the Wi-Fi device, based on detecting the trigger.

2. The method of claim 1, wherein the UE receives signals of at least one of the 5G BS, the 4G BS, the Wi-Fi device while detecting the event related to the voice call, wherein the voice call is preferred for a cellular network over a Wi-Fi network at the UE, an IMS is registered over the 5G BS, the 5G BS is not supported for the voice call, and the Wi-Fi device and the 4G BS are supported for the voice call.

3. The method of claim 1, further comprising:
   detecting a precondition associated with a Radio Access Technology (RAT);
   detecting whether at least one of signal strength of the 5G BS and signal strength of at least one 4G BS meet a first threshold condition, the signal strength of the 5G BS is less than a fourth threshold signal strength, the signal strength of the Wi-Fi device is less than a rove-out threshold for handover, and the signal strength of the Wi-Fi device is less than a fifth threshold signal strength; and transferring the voice call from the Wi-Fi device to the 5G BS or a first 4G BS of the at least one 4G BS, wherein the precondition associated with the RAT comprises one of:

the 5G BS not being supported for the voice call, and the Wi-Fi device and the at least one 4G BS being supported for the voice call; and the 5G BS, the Wi-Fi device and the at least one 4G BS being supported for the voice call.

4. The method of claim 3, wherein detecting that the signal strength of the 5G BS and the signal strength of the at least one 4G BS meets the first threshold condition, comprises:

detecting that the signal strength of the 5G BS is greater than a first threshold signal strength;

determining the signal strength of the at least one 4G BS by performing a LTE profiling with a period, wherein the period is determined based on UE parameters; and detecting that the signal strength of the at least one 4G BS is greater than a second threshold signal strength, wherein the second threshold signal strength is greater than or equal to the first threshold signal strength.

5. The method of claim 3, wherein transferring the voice call from the Wi-Fi device to the first 4G BS of the at least one 4G BS, comprises:

transferring the voice call from the Wi-Fi device to the 5G BS, upon detecting that the signal strength of the 5G BS and the signal strength of the at least one 4G BS meet the first threshold condition;

sending a Measurement Report (MR) to an optimal 4G BS of the at least one 4G BS to aid the cellular network in redirection; and transferring the voice call from the 5G BS to the first 4G BS or the optimal 4G BS based on a redirection from the cellular network, wherein the method further comprises:

checking whether the signal strength of the first 4G BS is less than a third threshold signal strength upon transferring the voice call from the 5G BS to the first 4G BS; and performing one of:

continuing the voice call on the first 4G BS, upon determining that the signal strength of the first 4G BS is not less than the third threshold signal strength, and transferring the voice call from the first 4G BS to the Wi-Fi device or a second 4G BS, upon determining that the signal strength of the first 4G BS is less than the third threshold signal strength, wherein the second 4G BS has the signal strength better than the signal strength of the first 4G BS.

6. The method of claim 3, wherein transferring the voice call from the Wi-Fi device to the first 4G BS of the at least one 4G BS, comprises:

initiating an idle mode on the 5G BS, upon detecting that the signal strength of the 5G BS and the signal strength of the at least one 4G BS meet the threshold condition;

performing reselection to an optimal 4G BS of the at least one 4G BS with a desired signal strength; and transferring the voice call from the Wi-Fi device to the optimal 4G BS.

7. The method of claim 3, wherein transferring the voice call from the Wi-Fi device to the first 4G BS of the at least one 4G BS, comprises:

receiving a list of Inter Radio Access Technology (IRAT) 4G BSs from an idle/connected mode Ncell database, upon detecting that the signal strength of the Wi-Fi device is less than the rove-out threshold for handover and the signal strength of the 5G BS is less than the fourth threshold signal strength;

identifying a IRAT 4G BS from the list of IRAT 4G BSs based on a signal strength meeting a second threshold condition; and transferring the voice call from the Wi-Fi device to the IRAT 4G BS, wherein transferring the voice call from the Wi-Fi device to the IRAT 4G BS, comprises:

performing one of:

transferring the voice call from the Wi-Fi device to the IRAT 4G BS during an RRC idle mode by performing an idle mode reselection to the IRAT 4G BS from the 5G BS based on a System Information Block (SIB), transferring the voice call from the Wi-Fi device to the IRAT 4G BS during an RRC connected mode by sending a MR to the cellular network based on the IRAT 4G BS being configured at the UE, and transferring the voice call from the Wi-Fi device to the IRAT 4G BS during the RRC connected mode by internally releasing a RRC connection and triggering the idle mode for doing reselection when the IRAT 4G BS is not configured at the UE.

8. The method of claim 3, wherein transferring the voice call from the Wi-Fi device to the 5G BS comprises:

transferring the voice call from the Wi-Fi device to the 5G BS, upon detecting that the signal strength of the Wi-Fi device is less than the fifth threshold signal strength;

initiating a timer;

determining whether a Quality of Service (QOS) is established on the 5G BS for the voice call; and terminating the timer and continuing the voice call over the 5G BS, upon determining that the QoS is established on the 5G BS for the voice call.

9. The method of claim 8, wherein the method further comprises:

performing an Evolved Packet System Fallback (EPSFB) procedure to transfer the voice call from the 5G BS to the 4G BS, upon determining that the QoS is not established on the 5G BS for the voice call;

determining whether the EPSFB procedure is successful; and performing one of:

terminating the timer and transferring the voice call from the 5G BS to the 4G BS, upon determining that the EPSFB procedure is successful, and terminating the timer and continuing the voice call over the 5G BS, upon determining that the EPSFB procedure is unsuccessful, wherein continuing the voice call over the 5G BS comprises:

establishing an internet Protocol Data Unit (PDU) session on the 5G BS;

triggering to establish an Evolved Packet Data Gateway (ePDG)/Non-3GPP Interworking Function (N3IWF) on the 5G BS using an internet bearer; and performing one of:

transferring the voice call to the Wi-Fi device, when the ePDG/N3IWF is not established on the 5G BS, and transferring the voice call to the 5G BS, when the ePDG/N3IWF is established on the 5G BS.

10. The method of claim 1, wherein the method further comprises:
   shifting the IMS registration from the 5G BS to the 4G BS, upon determining that the signal strength of the 4G BS is greater than the signal strength of the Wi-Fi device;
   detecting the trigger for the voice call; and
   initiating the voice call over the 4G BS.

11. A User Equipment (UE) configured to enhance voice call performance, comprising:
   memory storing instructions; and
   at least one processor coupled to the memory, wherein the instructions, when executed by the at least one processor, cause the UE to:
      perform an Internet protocol Multimedia Subsystem (IMS) registration with a $5^{th}$ Generation (5G) Base Station (BS);
      detect an event related to a voice call while the IMS registration is with the 5G BS;
      compare signal strength of a Wireless Fidelity (Wi-Fi) and signal strength of a $4^{th}$ Generation (4G) BS based on detecting the event related to the voice call;
      shift the IMS registration from the 5G BS to the Wi-Fi device, upon determining that the signal strength of the Wi-Fi device is greater than the signal strength of the 4G BS;
      detect a trigger for the voice call after shifting the IMS registration from the 5G BS to the Wi-Fi device; and
      initiate the voice call over the Wi-Fi device, based on detecting the trigger.

12. The UE of claim 11, wherein the instructions, when executed by the at least one processor, cause the UE to: receive signals of at least one of the 5G BS, the 4G BS, the Wi-Fi device while detecting the event related to the voice call, wherein a voice call is preferred for a cellular network over a Wi-Fi network at the UE, an IMS is registered over the 5G BS, the 5G BS is not supported for the voice call, and the Wi-Fi device and the 4G BS are supported for the voice call.

13. The UE of claim 11, wherein the instructions, when executed by the at least one processor, cause the UE to:
   detect a precondition associated with a Radio Access Technology (RAT);
   detect whether at least one of signal strength of the 5G BS and signal strength of at least one 4G BS meet a first threshold condition, the signal strength of the 5G BS is less than a fourth threshold signal strength, the signal strength of the Wi-Fi device is less than a rove-out threshold for handover, and the signal strength of the Wi-Fi device is less than a fifth threshold signal strength; and
   transfer the voice call from the Wi-Fi device to the 5G BS or a first 4G BS of the at least one 4G BS,
   wherein the precondition associated with the RAT comprises one of:
   the 5G BS not being supported for the voice call, and the Wi-Fi device and the at least one 4G BS being supported for the voice call; and
   the 5G BS, the Wi-Fi device and the at least one 4G BS being supported for the voice call.

14. The UE of claim 13, wherein for detecting that the signal strength of the 5G BS and the signal strength of the at least one 4G BS meet the first threshold condition, the instructions, when executed by at least one processor, cause the UE to:
   detect that the signal strength of the 5G BS is greater than a first threshold signal strength;
   determine the signal strength of the at least one 4G BS by performing a LTE profiling with a period, wherein the period is determined based on UE parameters; and
   detect that the signal strength of the at least one 4G BS is greater than a second threshold signal strength, wherein the second threshold signal strength is greater than or equal to the first threshold signal strength.

15. The UE of claim 13, wherein for transferring the voice call from the Wi-Fi device to the first 4G BS of the at least one 4G BS, the instructions, when executed by the at least one processor, cause the UE to:
   transfer the voice call from the Wi-Fi device to the 5G BS, upon detecting that the signal strength of the 5G BS and the signal strength of the at least one 4G BS meet the first threshold condition;
   send a Measurement Report (MR) to an optimal 4G BS of the at least one 4G BS to aid the cellular network in proper redirection; and
   transfer the voice call from the 5G BS to the first 4G BS or the optimal 4G BS based on a redirection from the cellular network,
   wherein the instructions, when executed by the at least one processor, cause the UE to:
   check whether the signal strength of the first 4G BS is less than a third threshold signal strength upon transferring the voice call from the 5G BS to the first 4G BS; and
   perform one of:
      continuing the voice call on the first 4G BS, upon determining that the signal strength of the first 4G BS is not less than the third threshold signal strength, and
      transferring the voice call from the first 4G BS to the Wi-Fi device or a second 4G BS, upon determining that the signal strength of the first 4G BS is less than the third threshold signal strength, wherein the second 4G BS has the signal strength better than the signal strength of the first 4G BS.

16. The UE of claim 13, wherein for transferring the voice call from the Wi-Fi device to the first 4G BS of the at least one 4G BS, the instructions, when executed by the at least one processor, cause the UE to:
   initiate an idle mode on the 5G BS, upon detecting that the signal strength of the 5G BS and the signal strength of the at least one 4G BS meet the threshold condition;
   perform reselection to an optimal 4G BS of the at least one 4G BS with a desired signal strength; and
   transfer the voice call from the Wi-Fi device to the optimal 4G BS.

17. The UE of claim 13, wherein for transferring the voice call from the Wi-Fi device to the first 4G BS of the at least one 4G BS, the instructions, when executed by the at least one processor, cause the UE to:
   receive a list of Inter Radio Access Technology (IRAT) 4G BSs from an idle/connected mode Ncell database, upon detecting that the signal strength of the Wi-Fi device is less than the rove-out threshold for handover and the signal strength of the 5G BS is less than the fourth threshold signal strength;
   identify a IRAT 4G BS from the list of IRAT 4G BSs with a signal strength meets a second threshold condition; and
   transfer the voice call from the Wi-Fi device to the IRAT 4G BS, wherein for transferring the voice call from the Wi-Fi device to the IRAT 4G BS, the at least one processor is configured to:

perform one of:
- transferring the voice call from the Wi-Fi device to the IRAT 4G BS during an RRC idle mode by performing an idle mode reselection to the IRAT 4G BS from the 5G BS based on a System Information Block (SIB),
- transferring the voice call from the Wi-Fi device to the IRAT 4G BS during an RRC connected mode by sending a MR to the cellular network based on the IRAT 4G BS being configured at the UE, and
- transferring the voice call from the Wi-Fi device to the IRAT 4G BS during the RRC connected mode by internally releasing a RRC connection and triggering the idle mode for doing reselection when the IRAT 4G BS is not configured at the UE.

18. The UE of claim 13, wherein for transferring the voice call from the Wi-Fi device to the 5G BS, the instructions, when executed by the at least one processor, cause the UE to:
- transfer the voice call from the Wi-Fi device to the 5G BS, upon detecting that the signal strength of the Wi-Fi device is less than the fifth threshold signal strength;
- initiate a timer;
- determine whether a Quality of Service (QOS) is established on the 5G BS for the voice call; and
- terminate the timer and continuing the voice call over the 5G BS, upon determining that the QoS is established on the 5G BS for the voice call.

19. The UE of claim 18, wherein the instructions, when executed by the at least one processor, cause the UE to:
- perform an Evolved Packet System Fallback (EPSFB) procedure to transfer the voice call from the 5G BS to the 4G BS, upon determining that the QoS is not established on the 5G BS for the voice call;
- determine whether the EPSFB procedure is successful; and
- perform one of:
  - terminating the timer and transferring the voice call from the 5G BS to the 4G BS, upon determining that the EPSFB procedure is successful, and
  - terminating the timer and continuing the voice call over the 5G BS, upon determining that the EPSFB procedure is unsuccessful, wherein for continuing the voice call over the 5G BS, the at least one processor is configured to:
- establish an internet Protocol Data Unit (PDU) session on the 5G BS;
- trigger to establish an Evolved Packet Data Gateway (ePDG)/Non-3GPP Interworking Function (N3IWF) on the 5G BS using an internet bearer; and
- perform one of:
  - transferring the voice call to the Wi-Fi device, when the ePDG/N3IWF is not established on the 5G BS, and
  - transferring the voice call to the 5G BS, when the ePDG/N3IWF is established on the 5G BS.

20. The UE of claim 11, wherein the instructions, when executed by the at least one processor, cause the UE to:
- shift the IMS registration from the 5G BS to the 4G BS, upon determining that the signal strength of the 4G BS is greater than the signal strength of the Wi-Fi device;
- detect the trigger for the voice call; and
- initiate the voice call over the 4G BS.

* * * * *